US008641883B2

United States Patent
Kulinsky et al.

(10) Patent No.: US 8,641,883 B2
(45) Date of Patent: Feb. 4, 2014

(54) POLYMER-BASED HIGH SURFACE AREA MULTI-LAYERED THREE-DIMENSIONAL STRUCTURES AND METHOD OF MAKING SAME

(75) Inventors: Lawrence Kulinsky, Los Angeles, CA (US); Marc J. Madou, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 328 days.

(21) Appl. No.: 13/029,899

(22) Filed: Feb. 17, 2011

(65) Prior Publication Data

US 2011/0203936 A1 Aug. 25, 2011

Related U.S. Application Data

(60) Provisional application No. 61/306,913, filed on Feb. 22, 2010.

(51) Int. Cl.
*C25D 5/02* (2006.01)
*C25D 5/16* (2006.01)

(52) U.S. Cl.
USPC .......................................... 205/118; 205/95

(58) Field of Classification Search
USPC ................................... 205/118, 95
See application file for complete search history.

(56) References Cited

U.S. PATENT DOCUMENTS

2008/0230390 A1* 9/2008 Cohen .......................... 205/118

OTHER PUBLICATIONS

Martin, David C., et al., "Electrochemical Polymerization of Conducting Polymer Coatings on Neural Presthetic Devices: Nanomushrooms of Polypyrrole Using Block copolymer thin films as template" Material Research Society Symposium Proc. vol. 734 (2003).*
Wang, Chunlei, et al. "Carbon Microstructures for Glucose Biosensor" NSTI-Nanotech vol. 2, 2006.*
Yang, Chia-Min, et al., "Facile Template Synthesis of Ordered Mesoporous Carbon with Polypyrrole as Carbon Precursor" Chem. Mater., 2005, 17, 355-358.*
Viswanathan, B., et al. "Preparation of Pt-Ru bimetallic system supported on carbon nanotubes" Mater. Commun., 2000, 10, 1757-1759.*
Lowe, C.R., et al., "Amperometric response of polypyrrole entrapped bienzyme films" Sensors and Actuators B, 7, 1992, p. 339-342.*

* cited by examiner

*Primary Examiner* — Keith Hendricks
*Assistant Examiner* — Stefanie Sherrill
(74) *Attorney, Agent, or Firm* — Vista IP Law Group LLP

(57) ABSTRACT

A method of forming three-dimensional structures includes forming a conductive layer on a substrate and patterning a resist layer over the conductive layer, the resist layer having contained therein a plurality of vias. An electrically conductive polymer is then electro-deposited in the vias. The electro-deposition operation is then stopped to form one or more of posts, posts having bulbous termini (i.e., mushrooms), or a layer atop the resist layer. The resist may be removed to yield the structure which may be further processed. For example, the structure may be pyrolyzed. In addition, biomolecules may also be adhered or otherwise affixed to the structure.

15 Claims, 3 Drawing Sheets

POLYMER-BASED HIGH SURFACE AREA MULTI-LAYERED THREE-DIMENSIONAL STRUCTURES AND METHOD OF MAKING SAME

REFERENCE TO RELATED APPLICATIONS

This Application claims priority to U.S. Provisional Patent Application No. 61/306,913 filed on Feb. 22, 2010. U.S. Provisional Patent Application No. 61/306,913 is incorporated by reference as if set forth fully herein.

FIELD OF THE INVENTION

The field of the invention generally relates to methods of constructing high surface area structures using photoresist patterning in combination with electrochemical polymer deposition. The methods described herein can be used to create structures for a wide variety of applications including, but not limited to, micro-reactors, electrodes, and sensors (e.g., biosensors).

BACKGROUND OF THE INVENTION

High surface area structures are utilized for variety of purposes such as increasing the rate of chemical and electrochemical reactions and enhancing the sensitivity of biosensors. High surface areas provide abundant places where absorption or reactions of interest can take place thereby increasing the reaction rate. Typical conductive high surface area structures sometimes involve carbon powders and nanotubes. While the use of micro-sized and nano-sized particles provides large surface areas, such an approach carries a significant disadvantage. In particular, there is a rise in resistance due to particle-to-particle conduction losses. A superior electrode structure would have a tailored geometry optimizing the trade-off between higher surface area and the decrease in resistance losses.

SUMMARY

The structures and methods described herein enable the formation of conductive structures having a controlled geometry. Generally, the electro-deposition of polymer materials having electrically conductive properties into vias or holes of a resist material enables the formation of a variety of structures including posts, posts with bulbous termini (i.e., mushrooms), plates, and multi-plates. In one aspect of the invention, the structures can be subsequently decorated by conductive nano-particles or nanotubes to further increase surface area without much of a resistive loss. These structures may also incorporate one or more biomolecules (e.g., enzymes) during their formation to enable sensor applications.

In one embodiment, for example, an enzymatic biosensor may be manufactured. The biosensor may be created by depositing an electroactive polymer (sometimes referred to as EAP) together with the enzyme on a high surface area conductive substrate. The manufacturing method may be used for the production of three-dimensional polymer-based high surface area topologies that can be used as a basis for biosensors as well as for a variety of other applications where high surface area of controlled geometry is desired. One aspect of the method of producing these high surface area structures is a property of lateral growth exhibited by the electroactive polymers during the deposition process. When the conductive polymer is getting deposited in a well or via defined by a window in a photoresist, after reaching the top of the well, the polymer will continue to grow laterally, creating a polymer layer on top of the photoresist. Photoresist can be dissolved in a subsequent step, leaving the layer of polymer supported by polymer pillars. Repeating these steps will produce three-dimensional, high surface area conductive structures.

In other embodiments, growth of the posts in the wells or vias is stopped at the post or mushroom stage. In this regard, the total effective surface area is still increased although not to the degree in the plate-based structure. In order to modify mechanical and electrical properties of the resulting structures, pyrolysis can be used as either an intermediate or final stage of the process. The resulting conductive structure can also be used as a high surface area electrode for the deposition of the polymer-enzyme mix for biosensor applications.

In one embodiment, a method of forming a three-dimensional structure includes the operations of forming a conductive layer on a substrate and patterning a resist layer over the conductive layer, the resist layer having contained therein a plurality of vias. An electrically conductive polymer is electro-deposited in the vias. The electro-deposition operation is stopped at a particular point in time to form one or more of posts, posts with bulbous termini, or a layer atop the resist layer. Posts are formed by stopping the electro-deposition process earlier, while additional electro-deposition time produces the posts with bulbous termini (i.e., mushrooms). Even longer electro-deposition times produce a layer of electrically conductive polymer atop the resist layer.

In another embodiment, a method of forming a three dimensional structure includes applying a resist material on an electrode surface and forming a plurality of vias in the resist material, the vias comprising an opening in the resist material providing access to the electrode surface. An electrically conductive polymer is electro-deposited into the plurality of vias to form a plurality of posts and the resist material is removed.

In still another embodiment, a method of forming a three dimensional structure includes applying a resist material on an electrode surface and forming a plurality of vias in the resist material, the vias comprising an opening in the resist material providing access to the electrode surface. An electrically conductive polymer is electro-deposited into the plurality of vias to form a plurality of posts having a bulbous terminus. The resist material is then removed.

Advantages of the methods and structures disclosed herein include: (1) creation of high surface area three-dimensional conductive structures with a controlled geometry; (2) final electrical and chemical properties of the structures can be modified by using a variety of monomers and by using various dopants and enzymes added during the electrodeposition step; (3) final specific surface area can be controlled by varying the number of layers deposited and by the modification of spacing and the cross-sectional geometry of the support pillars; (4) specific surface area can be increased further by the subsequent decoration of the resulting surfaces with nanoparticles or nanotubes; (5) high surface areas can be used in an enzymatic biosensor if enzymes are added during the deposition process; (6) the proposed technology gives flexibility to either produce an array of posts, a single extra layer of surface, or multiple layers of three-dimensional high surface area structures.

DETAILED DESCRIPTION OF THE ILLUSTRATED EMBODIMENTS

Figures 1A, 1B, 1C, 1D, 1E, 1F, 1G:
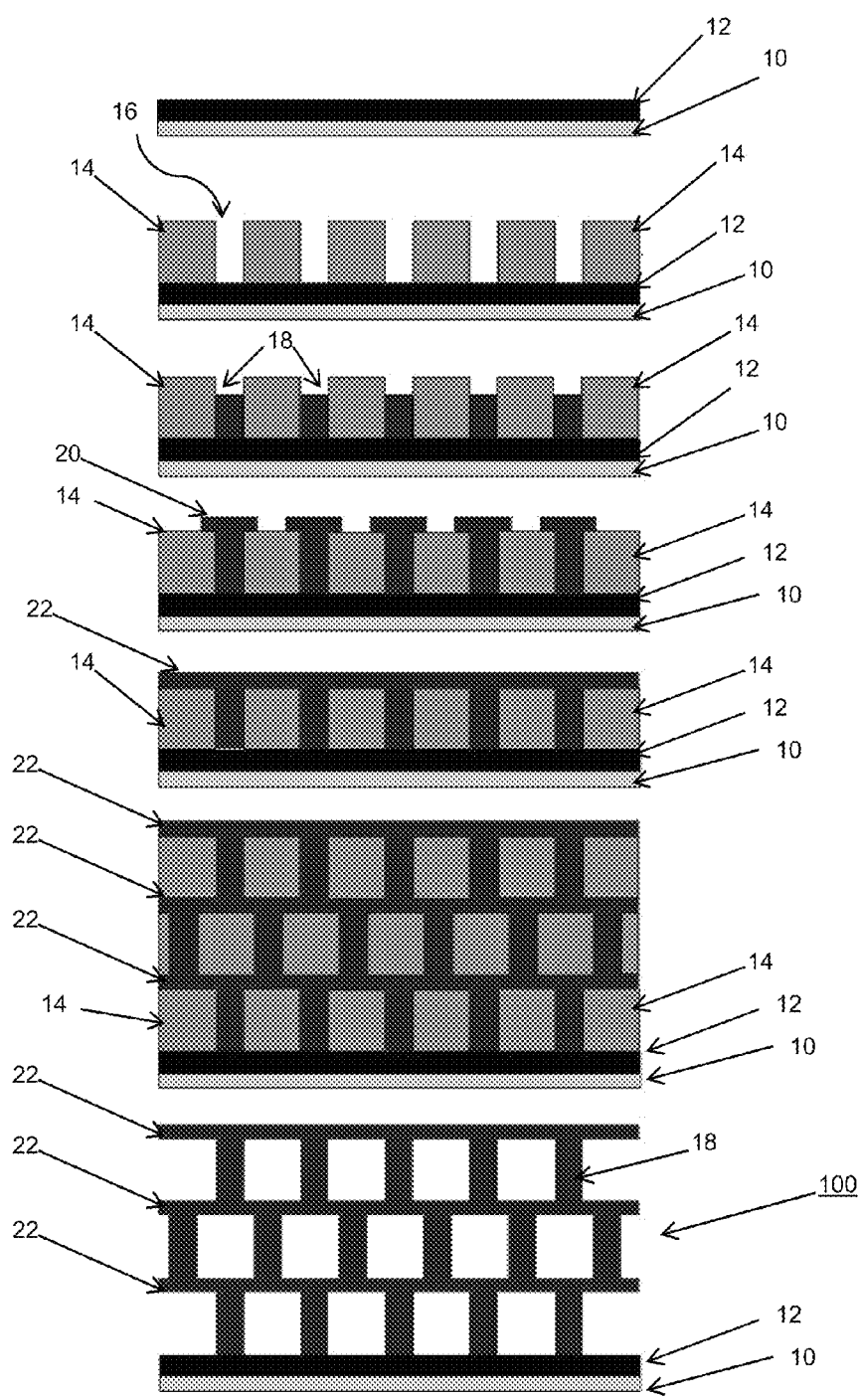
FIG. 1A illustrates a substrate such as a silicon wafer along with an electrically conductive electrode layer disposed on top of the substrate.
FIG. 1B illustrates a patterned resist material (e.g., photoresist) that is located on top of the conductive electrode layer.
FIG. 1C illustrates electro-deposition of a conductive polymer to form posts within vias of the resist material.
FIG. 1D illustrates further electro-deposition of the conductive polymer to form posts with each post having a bulbous terminus (i.e., mushrooms).
FIG. 1E illustrates even further electro-deposition of the conductive polymer to form a polymer layer atop the resist material.
FIG. 1F illustrates a multilayer polymer structure (with resist) after repeating the process to form second and third layers of the conductive polymer (and adjoining posts).
FIG. 1G illustrates the structure of FIG. 1F with the resist material removed, for example, using a solvent or the like. The structure may be optionally pyrolyzed.

Turning now to FIG. 1A, a substrate 10 is provided on which the high surface area structure 100 is formed. The substrate 10 may include, for instance, a silicon wafer although other materials may be used including polymer-based materials. The substrate 10 is typically rigid or semi-rigid material. Still referring to FIG. 1A, an electrically conductive electrode 12 is deposited on the substrate 10. The conductive electrode 12 may be formed, for instance, by pyrolyzed carbon (e.g., pyrolyzed SU-8 photoresist). The conductive electrode 12 may also be formed from other materials, however, such as metals or the like.

Next, as seen in FIG. 1B, a resist material 14 is deposited on top of the conductive electrode 12 and subsequently patterned to form wells for vias 16 opening to the underlying conductive electrode 12. The vias 16 are formed in the resist material 14 using conventional semiconductor processing steps. The resist material 14 may include a photoresist such as, for example, AX P4620 (Available from AZ Electronic Materials, Branchburg, N.J.), although other resists may be used. For instance, the resist material 14 may be spin-coated onto the substrate 10 and conductive electrode 12. A mask (not shown) may be disposed over the resist material 14 and the vias 16 may be formed using conventional photolithography and resist removal techniques.

Once the vias 16 are formed in the resist material 14, a polymer material having electrically conductive properties is electro-deposited into the vias 16. With reference to FIG. 1C, the conductive electrode 12 located on the substrate 10 is used as a working electrode in conjunction with a reference electrode (not shown) and a counter-electrode (not shown) to initiate the deposition of polymers from a monomer solution disposed over the patterned resist material 14. In one example, the polymer material that is electro-deposited into the vias 16 is polypyrrole (PPy). For polypyrrole (PPy) deposition, voltages in the range from 0.6V to 1.2V (relative to an Ag/AgCl reference electrode) may be used. With the applied voltage, a polymer layer will start depositing on the working electrode, namely the conductive electrode 12, and will start growing vertically inside the wells or vias 16, filling them and producing post structures. A post structure 18 is a column-like structure that does not have any sort of bulbous terminus on the end. If the deposition process is stopped at this point, an array of conductive posts 18 or pillars will be produced as seen in FIG. 1C. While the process has been described above in terms of the electro-deposition of polypyrrole (PPy), Other materials that may be electrically deposited in wells or vias 16 may also be employed. Exemplary materials include, for instance, polyaniline (PANI), polyparaphenelene (PPP), poly (3-methylthiophene) (P3Mt), 3-methylthiophene (MTh), poly(N-methylpyrrole), poly(o-phenylenediamine) (o-PD), poly(3,4-ethylene-dioxythiophene) (PEDT), and the like.

If deposition is allowed to continue beyond the formation of the post structure 18, however, the polymer, upon reaching the top of the wells or vias 16 will start growing laterally, producing radial structures to form posts, each with a bulbous terminus, that look like mushrooms 20. This is illustrated in FIG. 1D. If deposition is continued for an even longer period of time, the lateral aspects of the bulbous portion will eventually extend laterally and merge to form a layer 22 of conductive polymer on the surface of the resist as seen in FIG. 1E. Thus, by controlling the time of electro-deposition, there is a choice of producing posts 18, posts with bulbous termini 20, or layers 22.

Referring now to FIG. 1F, optionally, the operations illustrated in FIGS. 1B-1E (resist layer deposition and patterning, polymer growth) can be repeated to produce multi-layered conductive 3D structures. FIG. 1F illustrates a multi-layer polymer structure that is formed in accordance with this embodiment of the method. In any of the embodiments, resist material 14 is etched out (for example, using acetone or other solvents used to etch resist material) to leave the suspended conductive polymer framework 100. FIG. 1G illustrates the polymer structure 100 with the resist material 14 removed. Still referring to FIG. 1G, the now created polymer structure 100 can be pyrolyzed at 900° C. in a Nitrogen atmosphere (or other inert gas) to create a rigid conductive three dimensional high surface area structure 100.

An optional next operation may involve decorating the created conductive structure 100 with nanoparticles or growing nanofilaments (or nanotubes) from the precursors incorporated during the deposition steps to further increase the specific surface area of the structure 100. The conductive high surface area structure that is fabricated can be used as a working electrode to deposit the mix of PPy and enzymes to produce the enzymatic biosensor with enhanced sensitivity. The polymer and the enzyme mix can be deposited in a single step or one can use an alternative approach where one performs the polymer deposition, dissolves the resist, pyrolyzes the polymer structure to produce conductive high surface area carbon backbone. A final operation is conducted to deposit the conductive polymer mixed with the enzyme onto the now-formed carbon structure 100. In this regard, the structure 100 forms a scaffolding or base onto which the enzymes are deposited. Of course, other particles and substances may be adhered, bonded to, or otherwise affixed to the structure 100.

Figure 2:
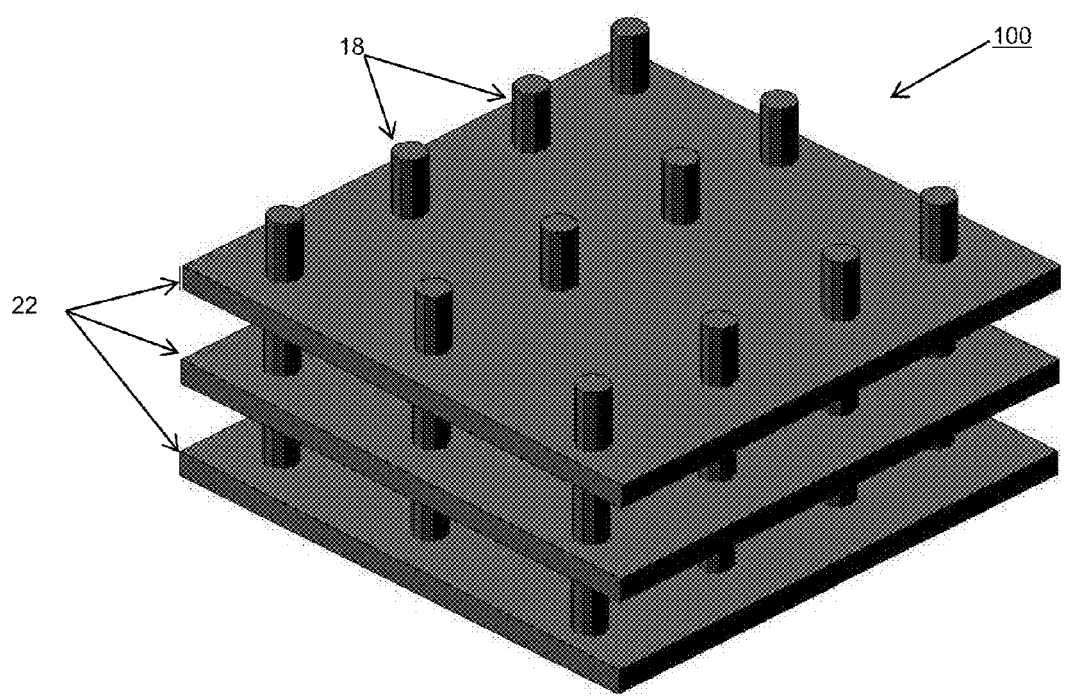
FIG. 2 is a perspective view of an exemplary three-dimensional conductive structure that can be formed with the methods described herein.

FIG. 2 illustrates is a perspective view of an exemplary three-dimensional conductive structure 100 that can be formed with the methods described herein. As seen in FIG. 2, the structure 100 consists of three (3) layers 22 of conductive polymer that are separated by posts 18. The resist material 14 has been removed illustrating the gaps or voids formed between the layers 22 and the posts 18. It is important to note that the spacing between the layers 22 and the posts 18 may be adjusted by patterning the resist material 14 accordingly. For example, the height of the posts 18 or the separation between the layers 22 may be increased by using a thicker layer of resist material 14. Also, the density of posts 18 may be increased by placing vias 16 closer to one another in the resist material 14 during the patterning process. In effect, the method enables the dimensional aspects of the final structure 100 to be tuned with a high degree of precision.

Figure 3:
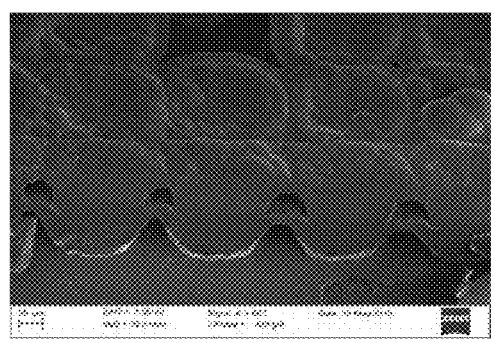
FIG. 3 illustrates a SEM micrograph image (perspective edge view) of a three dimensional structure 100 having two layers of polypyrrole grown atop an electrode layer.

FIG. 3 illustrates a SEM micrograph image (perspective edge view) of a three dimensional structure 100 having two layers of polypyrrole grown atop an electrode layer. FIG. 3 illustrates the convergence of the mushroom like structures into layers. In the structure 100 of FIG. 3, the post/mushroom spacing is very close (dimensional length of 20 µm is contained in FIG. 3 as a reference). Such a structure may be preferred to minimize or reduce electrical resistance.

Figures 4A, 4B, 4C, 4D, 4E:
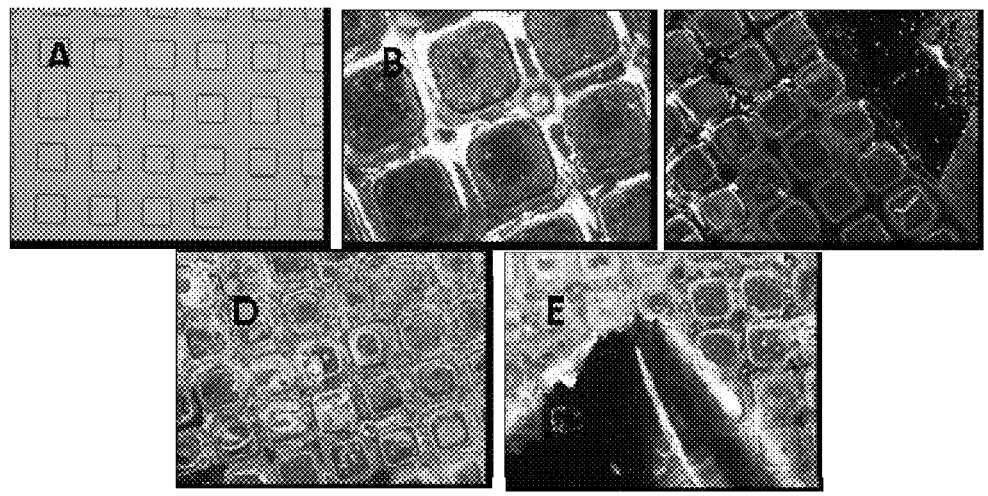
FIG. 4A illustrates a top-down view of the patterned resist material (AZ P4620 resist).
FIG. 4B illustrates a top-down view of the growth of polypyrrole (PPy) (dark, square-like posts) within the vias formed in the resist material.
FIG. 4C illustrates another top-down view of the growth of polypyrrole (PPy) showing additional growth of polypyrrole.
FIG. 4D illustrates further lateral growth of the polypyrrole layer such that a complete layer is formed.
FIG. 4E illustrates the polypyrrole layer being cut away with a tool after acetone was used to wash away the resist layer.

FIGS. 4A-4E illustrate images of the process used to form the structure 100. FIG. 4A illustrates a top-down view of the patterned resist material 14 (AZ P4620 resist). FIG. 4B illustrates a top-down view of the growth of polypyrrole (PPy) (dark, square-like posts) within the vias 16 formed in the resist material 14. FIG. 4C illustrates another top-down view showing additional growth of polypyrrole (PPy). In FIG. 4C, the beginning of lateral growth of the layer 22 over the resist material 14 can be seen. FIG. 4D illustrates further lateral growth of the layer 22 such that the complete layer 22 is formed. FIG. 4E illustrates the layer 22 being cut away with a tool after acetone was used to wash away the resist layer 14. The polypyrrole layer 22 is bent away revealing delaminated polypyrrole posts 18 located underneath the layer 22.

The method described herein may be used to construct structures 100 having varying degrees of increased surface areas. In one embodiment, the surface area is increased by the deposition of electrically conductive polymer posts 18 inside vias 16. In another embodiment which increases the surface area even more than the post embodiment, the surface area is increased by the deposition of electrically conductive polymer posts having bulbous termini (i.e., mushrooms). In still another embodiment which increases the surface area even more, deposition within the vias 16 proceeds beyond posts or mushrooms to form a layer 22 of electrically conductive polymer on top of the resist layer 14.

Optionally, in the case of a multi-layered structure, the operations outlined above may be repeated a number of times to produce multiple polymer layers. An optional pyrolysis step may be added to convert the resulting structure into electrically conductive carbon structures 100 having a specific geometry. The structures 100 can be used in a number of applications such as, for example, sensor applications (e.g., biosensors), catalytic micro-reactors, electrodes, and the like.

While embodiments of the present invention have been shown and described, various modifications may be made without departing from the scope of the present invention. The invention, therefore, should not be limited, except to the following claims, and their equivalents.

What is claimed is:

1. A method of forming a three-dimensional structure comprising:
    forming a conductive layer on a substrate;
    patterning a first resist layer over the conductive layer, the first resist layer having contained therein a plurality of vias;
    electro-depositing an electrically conductive polymer in the vias so as to completely fill the vias and continuing electro-deposition until the conductive polymer extends above an upper surface of the first resist layer and progresses laterally to merge to form a continuous electrically conductive polymer layer on the upper surface of the first resist layer;
    patterning a second resist layer over the continuous electrically conductive polymer layer disposed atop the first resist layer, the second resist layer having contained therein a plurality of vias; and
    electro-depositing the electrically conductive polymer in the vias of the second resist layer so as to completely fill the vias and continuing electro-deposition until the conductive polymer extends above an upper surface of the second resist layer and progresses laterally to merge to form a continuous electrically conductive polymer layer on the upper surface of the second resist layer.

2. The method of claim 1 further comprising:
    patterning a third resist layer over the electrically conductive polymer layer disposed atop the second resist layer, the third resist layer having contained therein a plurality of vias; and
    electro-depositing an electrically conductive polymer in the vias of the third resist layer so as to completely fill the vias and continuing electro-deposition until the conductive polymer extends above an upper surface of the third resist layer and progresses laterally to merge to form a continuous electrically conductive polymer layer on the upper surface of the third resist layer.

3. The method of claim 2, further comprising:
    patterning a fourth resist layer over the electrically conductive polymer layer disposed atop the third resist layer, the fourth resist layer having contained therein a plurality of vias; and
    electro-depositing an electrically conductive polymer in the vias of the fourth resist layer so as to completely fill the vias and continuing electro-deposition until the conductive polymer extends above an upper surface of the fourth resist layer and progresses laterally to merge to form a continuous electrically conductive polymer layer on the upper surface of the fourth resist layer.

4. The method of claim 1, further comprising removing the first resist layer.

5. The method of claim 4, further comprising pyrolyzing the electrically conductive polymer.

6. The method of claim 1, wherein the electrically conductive polymer comprises polypyrrole.

7. The method of claim 5, further comprising loading the pyrolyzed electrically conductive polymer with enzymes.

8. The method of claim 7, wherein the loading of enzymes comprises electro-depositing a mixture of enzymes and polypyrrole onto the pyrolyzed electrically conductive polymer.

9. The method of claim 5, further comprising decorating the pyrolyzed electrically conductive polymer with one of nanoparticles and nanofilaments.

10. The method of claim 1, wherein the substrate comprises silicon.

11. A method of forming a three dimensional structure comprising:

applying a resist material on an electrode surface;
forming a plurality of vias in the resist material, the vias comprising an opening in the resist material providing access to the electrode surface;
electro-depositing an electrically conductive polymer into the plurality of vias for a period of time sufficient to completely fill the plurality of vias and effectuate lateral migration of the electrically conductive polymer over an upper surface of the resist material such that electrically conductive polymer from the plurality of vias merges into a continuous layer of electrically conductive polymer;
applying a resist material on the continuous layer of electrically conductive polymer;
forming a plurality of vias in the resist material disposed atop the continuous layer of electrically conductive polymer;
electro-depositing the electrically conductive polymer into the plurality of vias in the resist material disposed atop the continuous layer of electrically conductive polymer for a period of time sufficient to completely fill the plurality of vias and effectuate lateral migration of the electrically conductive polymer over an upper surface of the resist material such that electrically conductive polymer from the plurality of vias merges into a second continuous layer of electrically conductive polymer; and
removing the resist material.

12. The method of claim 11, wherein the electrically conductive polymer comprises polypyrrole.

13. The method of claim 11, further comprising pyrolyzing the electrically conductive polymer.

14. The method of claim 13, further comprising loading the pyrolyzed electrically conductive polymer with a biomolecule.

15. The method of claim 14, wherein the loading of the biomolecule comprises electro-depositing a mixture of enzymes and polypyrrole onto the pyrolyzed electrically conductive polymer.

* * * * *